US008468282B2

(12) United States Patent
Awata

(10) Patent No.: US 8,468,282 B2
(45) Date of Patent: Jun. 18, 2013

(54) ARBITRATION DEVICE, ARBITRATION METHOD, IMAGE PROCESSING DEVICE, AND IMAGE FORMING SYSTEM

(75) Inventor: Yoshinori Awata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 426 days.

(21) Appl. No.: 12/796,118

(22) Filed: Jun. 8, 2010

(65) Prior Publication Data

US 2011/0145456 A1 Jun. 16, 2011

(30) Foreign Application Priority Data

Dec. 14, 2009 (JP) ................................ 2009-283248

(51) Int. Cl.
*G06F 13/36* (2006.01)
(52) U.S. Cl.
USPC ........... 710/113; 710/309; 710/240; 710/241; 710/244; 370/447; 370/461; 370/462
(58) Field of Classification Search
USPC .......... 710/240–244, 107–125, 309; 370/447, 370/461, 462
See application file for complete search history.

(56) References Cited

U.S. PATENT DOCUMENTS

| | | | | |
|---|---|---|---|---|
| 5,280,591 | A * | 1/1994 | Garcia et al. ................. | 710/111 |
| 5,758,104 | A * | 5/1998 | Gujral et al. ................. | 710/107 |
| 5,761,446 | A * | 6/1998 | Donley et al. ................ | 710/107 |
| 5,764,929 | A * | 6/1998 | Kelley et al. ................. | 710/107 |
| 6,026,460 | A * | 2/2000 | David et al. .................. | 710/309 |
| 6,081,859 | A * | 6/2000 | Munguia ....................... | 710/107 |
| 6,163,831 | A * | 12/2000 | Kermani ....................... | 711/150 |
| 6,237,055 | B1 * | 5/2001 | Trieu et al. ................... | 710/113 |
| 6,347,351 | B1 * | 2/2002 | Osborne et al. .............. | 710/119 |
| 6,401,176 | B1 * | 6/2002 | Fadavi-Ardekani et al. ........................... | 711/151 |
| 6,498,513 | B1 * | 12/2002 | Reynolds ...................... | 326/94 |
| 6,522,661 | B1 * | 2/2003 | Min ............................. | 370/445 |
| 6,671,761 | B2 * | 12/2003 | Kim ............................. | 710/244 |
| 6,934,871 | B2 * | 8/2005 | Day et al. ..................... | 713/502 |
| 7,281,071 | B2 * | 10/2007 | Carey .......................... | 710/113 |
| 7,814,253 | B2 * | 10/2010 | Kethareswaran et al. .... | 710/244 |

(Continued)

FOREIGN PATENT DOCUMENTS

| | | |
|---|---|---|
| JP | A-2005-225010 | 8/2005 |
| JP | A-2006-174346 | 6/2006 |
| JP | A-2007-52545 | 3/2007 |

OTHER PUBLICATIONS

Chehaibar et al. Specification and Verification of the PowerScale Bus Arbitration Protocol: An Industrial Experiment with LOTOS. Aug. 1996.*

(Continued)

*Primary Examiner* — Matthew D Spittle
(74) *Attorney, Agent, or Firm* — Oliff & Berridge, PLC

(57) ABSTRACT

An arbitration device includes an arbitration section, a counter, and a changing section. While write request signals and read request signals for a transfer path, are inputted from request sources, the arbitration section arbitrates an order that the write and read request signals use the transfer path, and when arbitration is settled, outputs use permission signals to the request sources. The changing section changes a time from outputting of the write request signals until inputting of the write request signals to the arbitration section, and/or a time from outputting of the use permission signals for the write request signals until inputting of the use permission signals to the request sources.

8 Claims, 19 Drawing Sheets

U.S. PATENT DOCUMENTS 8,065,457 B2 * 11/2011 Tischler .................. 710/240
8,086,776 B2 * 12/2011 Ishikawa .................. 710/241
2012/0084475 A1 * 4/2012 Fujiwara .................. 710/110

OTHER PUBLICATIONS

Turpin, Mike. OVL Examples. Jun. 21, 2006.*

Mahmud et al. A New Arbitration Circuit for Synchronous Multiple Bus Multiprocessor Systems. IEEE. 1990.*
IBM. 32-Bit OPB Arbiter Core. User's Manual. Version 1.9. May 2001.*
Xilinx. OPB Arbiter. Product Specification. Sep. 23, 2005.*
Actel. PCI Arbiter Core. Version 4.0. Jan. 2002.*

* cited by examiner

FIG.17

| PS_Y | PS_M | PS_C | PS_K | COUNT VALUE |
|---|---|---|---|---|
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 1 |
| 0 | 1 | 0 | 1 | 2 |
| 0 | 1 | 1 | 0 | 2 |
| 0 | 1 | 1 | 1 | 3 |
| 1 | 0 | 0 | 0 | 1 |
| 1 | 0 | 0 | 1 | 2 |
| 1 | 0 | 1 | 0 | 2 |
| 1 | 0 | 1 | 1 | 3 |
| 1 | 1 | 0 | 0 | 2 |
| 1 | 1 | 0 | 1 | 3 |
| 1 | 1 | 1 | 0 | 3 |
| 1 | 1 | 1 | 1 | 4 |

ARBITRATION DEVICE, ARBITRATION METHOD, IMAGE PROCESSING DEVICE, AND IMAGE FORMING SYSTEM

CROSS-REFERENCE TO RELATED APPLICATION

This application is based on and claims priority under 35 USC 119 from Japanese Patent Application No. 2009-283248 filed on Dec. 14, 2009.

BACKGROUND

1. Technical Field

The present invention relates to an arbitration device, an arbitration method, an image processing device, and an image forming system.

2. Related Art

A recording device that carries out recording by using a recording head is conventionally proposed.

Further, a data transmission control device and an arbitration circuit used in a recording device are conventionally proposed.

SUMMARY

An aspect of the present invention is an arbitration device including: an arbitration section to which write request signals for writing data to a storage using a transfer path, and read request signals for reading-out data from the storage using the transfer path, are inputted from a plurality of request sources, and that arbitrates an order that the inputted write request signals and read request signals use the transfer path, and that, when arbitration is settled, outputs use permission signals to the request sources; and a changing section that changes at least one of (a) a time from outputting of the write request signals until inputting of the write request signals to the arbitration section, or (b) a time from outputting of the use permission signals from the arbitration section with respect to the write request signals until inputting of the use permission signals to the request sources.

BRIEF DESCRIPTION OF THE DRAWINGS

Exemplary embodiments of the present invention will be described in detail based on the following figures, wherein:

FIG. 17 is an explanatory drawing showing an example of truth values used in the each page active number counter relating to the second exemplary embodiment;

DETAILED DESCRIPTION

[First Exemplary Embodiment]

A first exemplary embodiment is described in detail hereinafter with reference to the drawings.

First, the schematic structures of an image forming system, a DFE (digital front end processor), and a delay device of the present exemplary embodiment are described.

Figure 1:
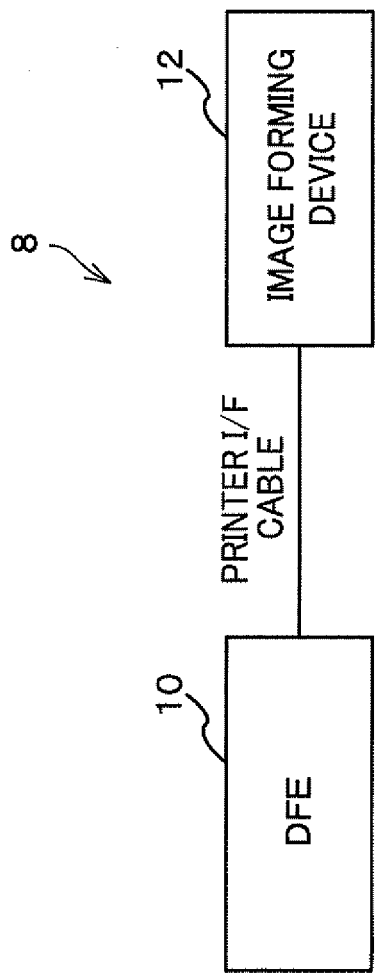
FIG. 1 is a block diagram showing an example of the schematic structure of an image forming system relating to a first exemplary embodiment.

FIG. 1 is a block diagram showing an example of the schematic structure of an image forming system of the first exemplary embodiment. An image forming system 8 of the present exemplary embodiment is structured by a Digital Front End Processor (DFE) 10 that carries out image processings, and an image forming device 12 that is connected to the DFE 10 by a printer interface cable (hereinafter, interface is abbreviated as I/F).

The image forming device 12 is a printer that forms (hereinafter "prints") an image on a recording medium on the basis of image data inputted from the DFE 10. In the present exemplary embodiment, the image forming device 12 is a color printer that forms a color image by superposing images of the four colors of Y (yellow), M (magenta), C (cyan) and K (black) on a recording medium. More specifically, the image forming device 12 is a tandem-type color image forming device in which plural photoreceptors are lined-up in the conveying direction of a recording medium, and images of the respective color components are formed on the recording medium at the respective photoreceptors so as to reproduce an original image.

The DFE 10 is a controller that carries out image processings and the like for carrying out image formation by the image forming device 12. The DFE 10 carries out Raster Image Processing (RIP) on data that expresses an image and is described in a Page Description Language (PDL) such as PostScript or PDF, and converts the data into image data. The image data that is subjected to RIP processing at the DFE 10 is transmitted to the image forming device 12 via the printer I/F cable.

Figure 2:
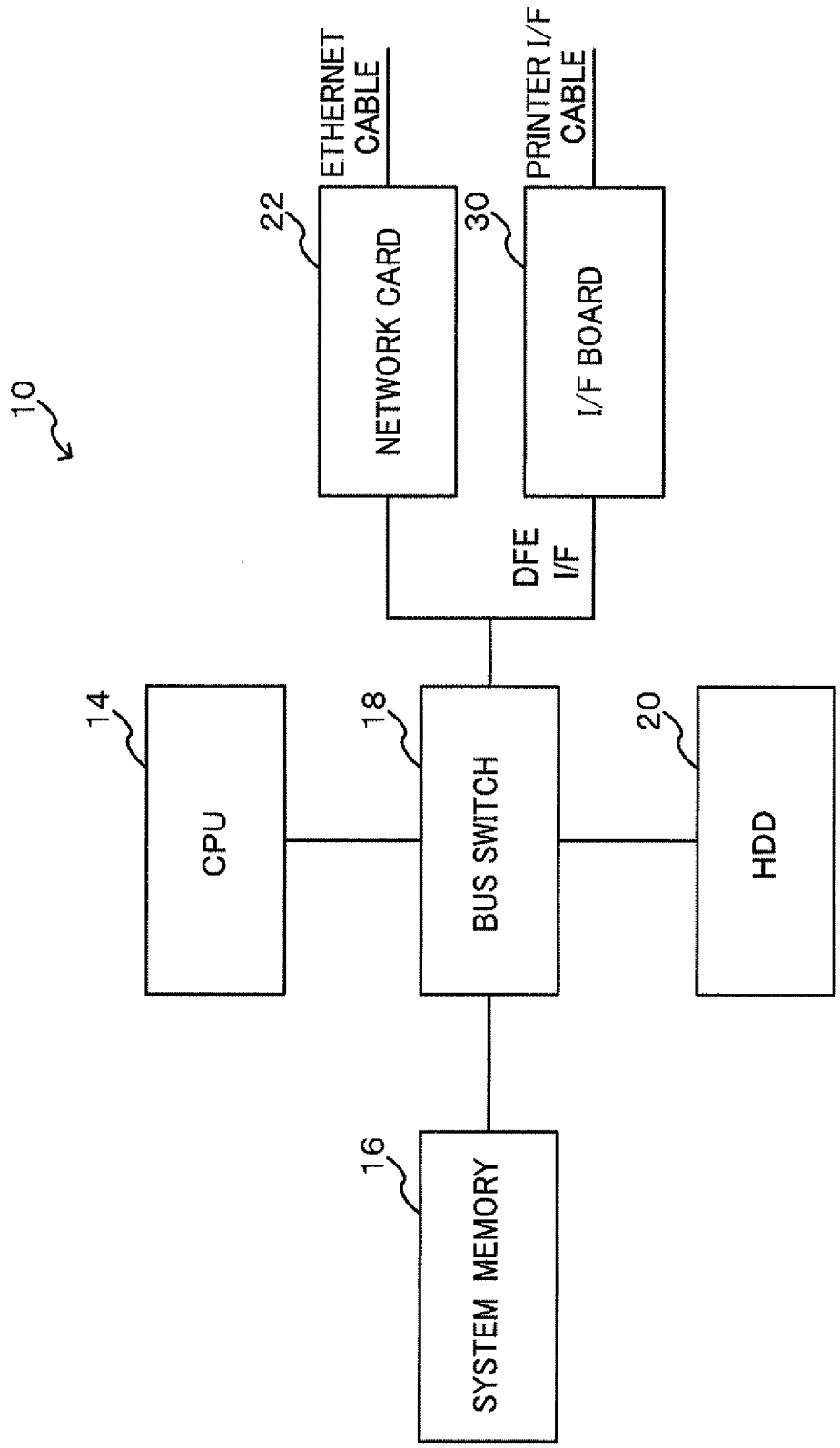
FIG. 2 is a block diagram showing an example of the schematic structure of a digital front end processor relating to the first exemplary embodiment.
Figure 3:
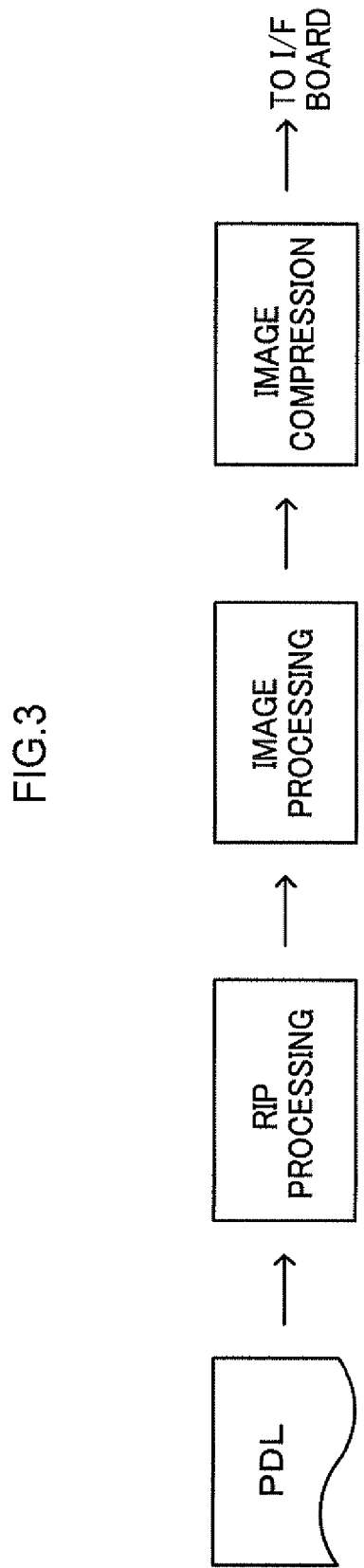
FIG. 3 is an explanatory drawing for explaining image processing that is carried out at the digital front end processor relating to the first exemplary embodiment.

A block diagram of an example of the schematic structure of the DFE 10 of the present exemplary embodiment is shown in FIG. 2. An example of the flow of processings that are carried out at the DFE 10 is shown in FIG. 3. The DFE 10 of the present exemplary embodiment formed of, as the base thereof, a personal computer. Specifically, the DFE 10 includes a CPU 14, a system memory 16, a bus switch 18, an HDD 20, a network card 22 serving as a communication section for communicating with external devices, and an I/F board 30. At the DFE 10, as shown in FIG. 3, RIP processing is carried out on image data that is described in PDL. Image processings, such as color adjustment that converts the color space from RGB to YMCK for example, and the like are carried out on the image data that has been subjected to the RIP processing. Further, image compression (data compression) of the image data that has been subjected to the image processings is carried out. The image data that has been subjected to the image processings in this way is outputted to the image forming device 12 by the printer I/F cable via the I/F board 30.

The image forming device 12 may be a high-speed printer that prints 100 A4-size pages per minute for example. Therefore, the DFE 10 outputs image data, that follows printing speed, to the image forming device 12 in real time. However, there are cases in which real time processing cannot be guaranteed for the operations of the respective processings shown in FIG. 3. Therefore, the I/F board 30 of the DFE 10 has a large-capacity memory (e.g., a capacity exceeding 1 GB). The image data is stored in the memory, and by ensuring that the outputting from the memory is carried out in real time, data transfer is made to follow the printing speed of the image forming device 12.

Figure 4:
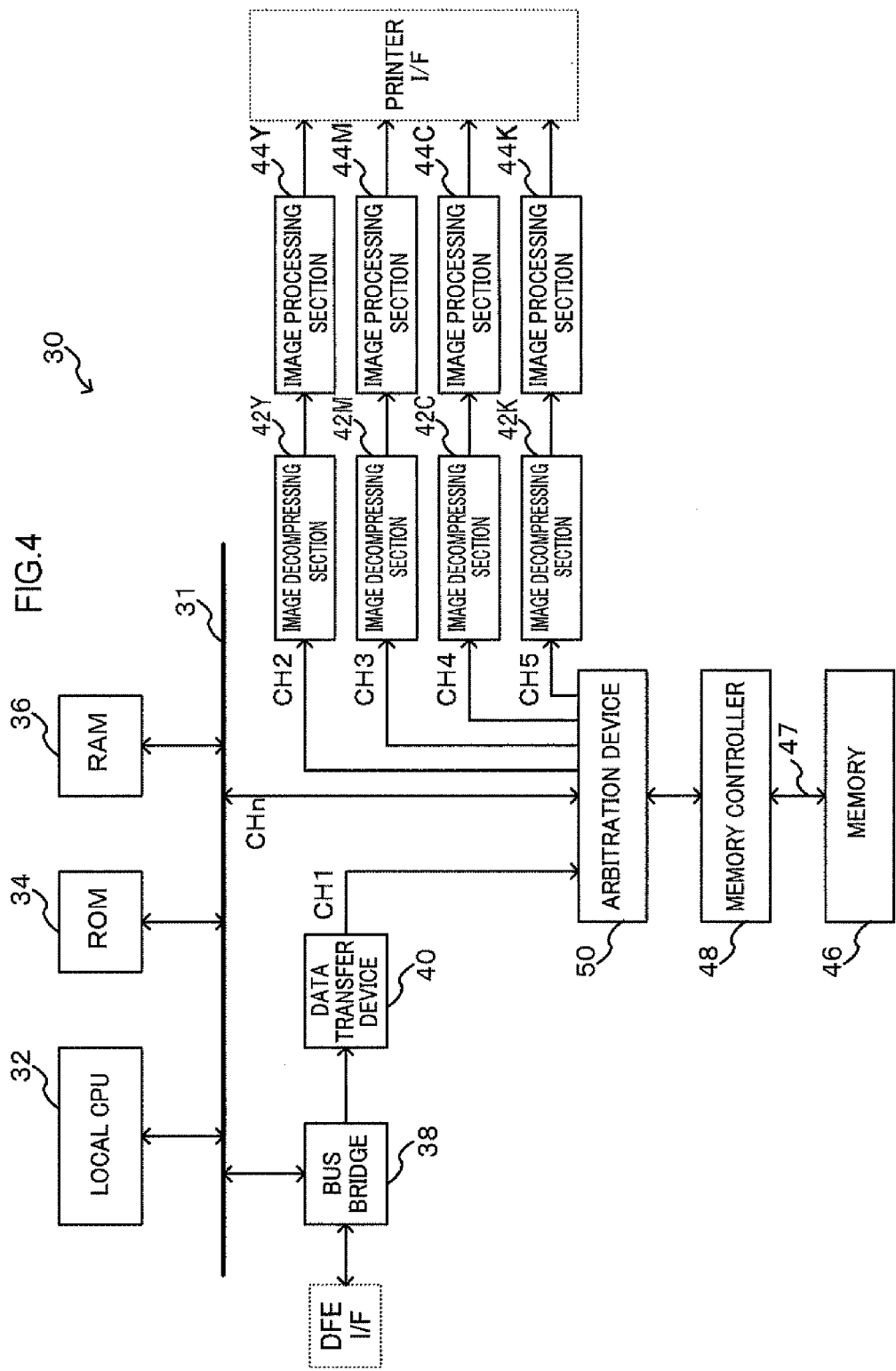
FIG. 4 is a block diagram showing an example of the schematic structure of an I/F board relating to the first exemplary embodiment.

A block diagram of an example of the schematic structure of the I/F board 30 is shown in FIG. 4. The I/F board 30 includes a local CPU 32, a ROM 34, a RAM 36, a bus bridge 38, a data transfer device 40, image decompressing sections 42Y, 42M, 42C, 42K, image processing sections 44Y, 44M, 44C, 44K, a memory 46, a memory controller 48, and an arbitration device 50. In the present exemplary embodiment, the arbitration device 50 is structured as an FPGA (Field Programmable Gate Array) for example. The local CPU 32, the ROM 34, the RAM 36, the bus bridge 38, and the arbitration device 50 are connected via a bus 31 such that data and the like can be transmitted and received thereamong.

The local CPU 32 carries out control of the entire I/F board 30, and controls the transfer of image data, data relating to printing, and the like. Control programs of various types of control that are executed at the local CPU 32 are stored in the ROM 34. The RAM 36 ensures an area for work at times when the control programs are executed at the local CPU 32.

The bus bridge 38 carries out bridging between, for example, PCI or PCIexpress, and the local bus (bus 31) of the I/F board 30 or a data transfer bus. The data transfer device 40 operates by a Direct Memory Access (DMA) method in order to transfer data from the DFE 10 to the memory 46. The image decompressing sections 42Y through 42K read-out, from the memory 46, the compressed data transferred to the memory 46 via the data transfer device 40, and decompress the data. The image processing sections 44Y through 44K carry out adjusting of the densities of the images, and the like.

The memory 46 is, as an example, an SDRAM (including Single Data Rate (SDR) type, Double Data Rate (DDR) type, or the like) that is based on a DRAM. When the memory controller 48 receives Write and Read commands from the arbitration device 50, the memory controller 48 carries out access that corresponds to the I/F of the memory 46. In the present exemplary embodiment, for example, a bus 47 of 500 MB/s, whose access band performance to the memory 46 is the standard performance in the random access of a DDR-SDRAM that is based on a DRAM, is used as the memory controller 48.

The arbitration device 50 adjusts the image data transfer performance by arbitrating the usage rights of using the bus 47 on the basis of a priority order, with respect to storage requests (write requests) for storing image data in the memory 46 from channel CH1 (the data transfer device 40), read requests for reading-out image data from the memory 46 from channel CH2 (the image decompressing section 42Y), channel CH3 (the image decompressing section 42M), channel CH4 (the image decompressing section 42C), channel CH5 (the image decompressing section 42K), and with respect to channel CHn (the local CPU 32).

Figure 5:
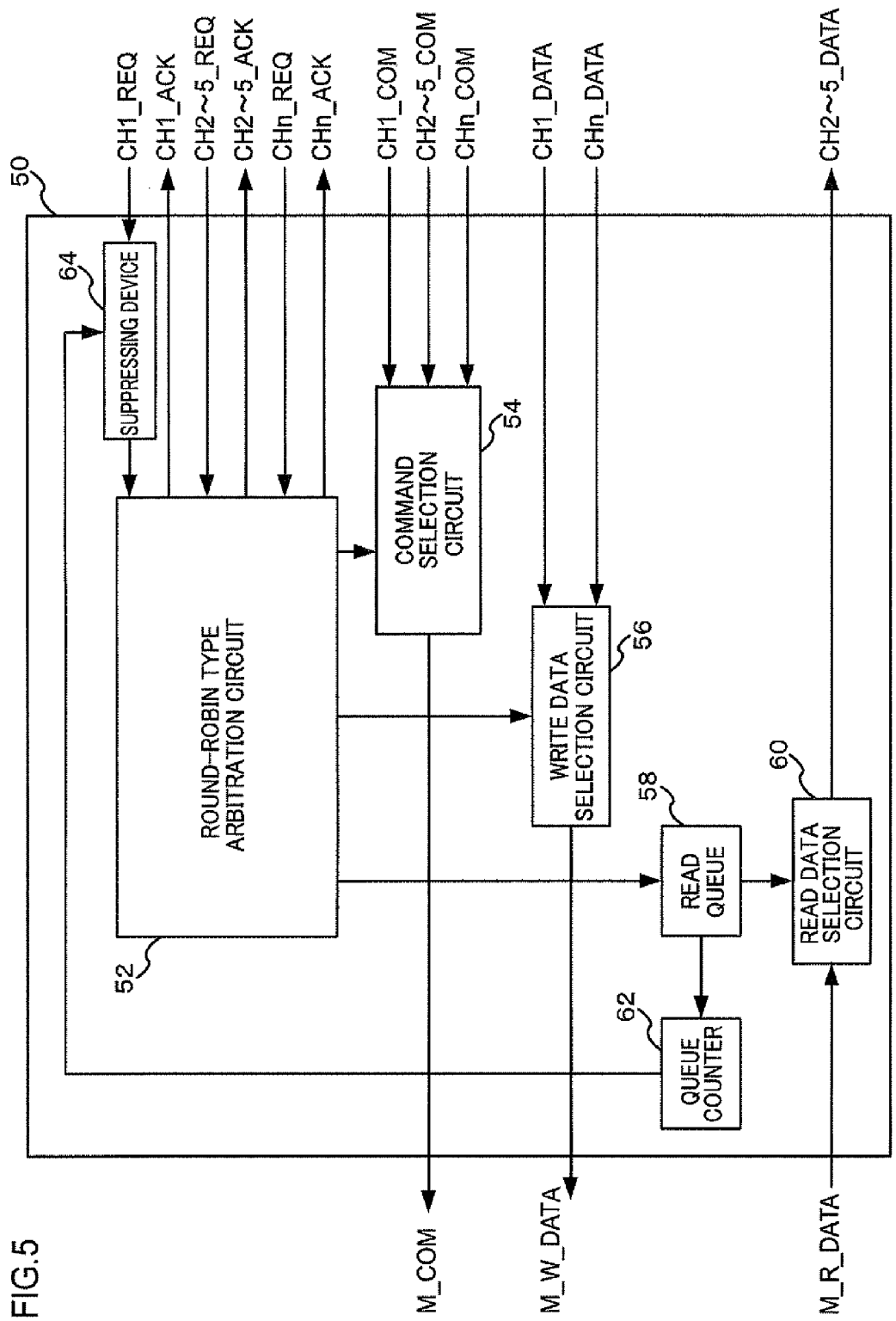
FIG. 5 is a block diagram showing an example of the schematic structure of an arbitration device relating to the first exemplary embodiment.

FIG. 5 is a block diagram of an example of the schematic structure of the arbitration device 50. The arbitration device 50 has a round-robin type arbitration circuit 52 (hereinafter simply called arbitration circuit 52), a command selection circuit 54, a write data selection circuit 56, a read queue 58, a read data selection circuit 60, a queue counter 62, and a suppressing device 64.

A priority register (not illustrated) is provided at the round-robin type arbitration circuit 52 for each of the channels (CH1 through CH5, CHn) that request arbitration. Each time a channel having a bus right finishes using the bus, the round-robin type arbitration circuit 52 lowers the priority of that channel to the lowest level and moves-up, by one level each, the contents of the priority registers of the channels having low priorities. Note that, although a round-robin type arbitration circuit is employed as an example in the present exemplary embodiment, the present invention is not limited to the same, and an arbiter of any structure that arbitrates requests from plural request sources may be used.

When access request signals REQ (CH1_REQ through CH5_REQ, CHn_REQ) from the data transfer device 40 (CH1), the image decompressing sections 42Y through 42K (CH2 through CH5), and the local CPU 32 (CHn) are inputted, the round-robin type arbitration circuit 52 arbitrates the usage rights of the bus 47 in accordance with the access request signals REQ, and outputs access permission signals ACK (CH1_ACK through CH5_ACK, CHn_ACK), When the respective channels receive the access permission signals ACK, the channels issue command signals COM (CH1_COM through CH5_COM, CHn_COM), and start the transfer of data signals DATA (CH1_DATA through CH5_DATA, CHn_DATA).

On the basis of the arbitration of the arbitration circuit 52, the command selection circuit 54 selects a command signal COM inputted from the respective channels, and outputs a selected signal (M_COM) to the memory controller 48. On the basis of the arbitration of the arbitration circuit 52, the write data selection circuit 56 selects either of the data signal DATA (CH1_DATA) inputted from channel CH1 and the data signal DATA (CHn_DATA) inputted from the CHn, and outputs a selected DATA signal (M_W_DATA) to the memory controller 48.

It takes time to output the data signals DATA with respect to read request signals rdreq of channels CH2 through CH5. Therefore, the read queue 58 is provided in order to store the order of the channels (CH2 through CH5) from which the read request signals rdreq have been received, and identify which channel a read data signal (M_R_DATA) from the memory controller 48 is. On the basis of the read queue 58, the read data selection circuit 60 selects and outputs, to the corresponding channel (CH2 through CH5), the data signal (M_R_DATA) that was read-out from the memory 46 and inputted via the memory controller 48.

The queue counter 62 is a counter that counts the number of channels from which the read request signals rdreq have been received at the read queue 58. The suppressing device 64 suppresses access of channel CH1 by, in accordance with the count value of the queue counter 62, delaying the time at which the access request signal CH1_REQ from channel CH1 is inputted to the arbitration circuit 52. Note that the queue counter 62 is an example of a counter, and the suppressing device 64 is an example of a delay section.

Figure 6:
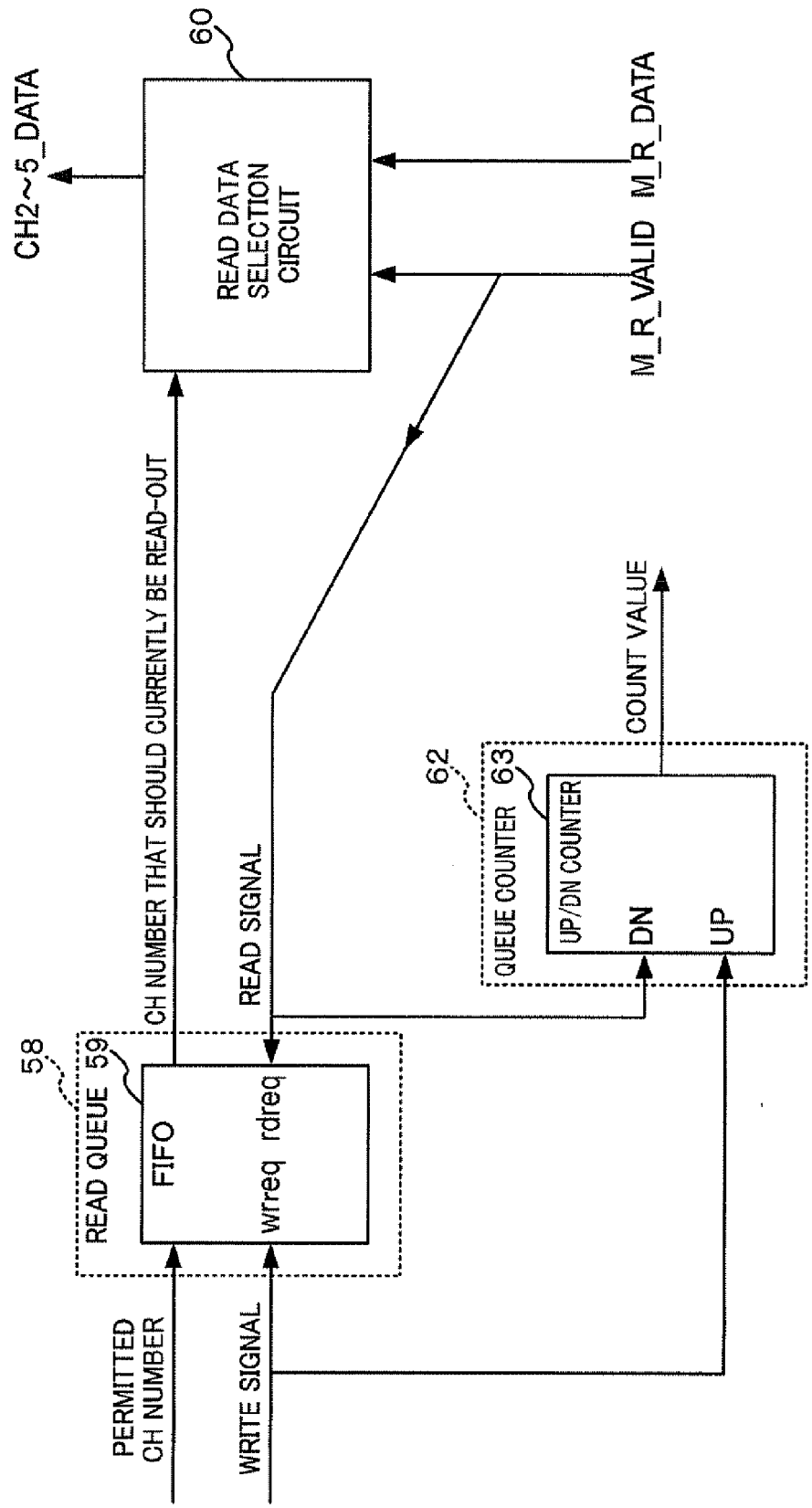
FIG. 6 is a block diagram showing examples of the schematic structures of a read queue and a queue counter relating to the first exemplary embodiment.
Figure 7:
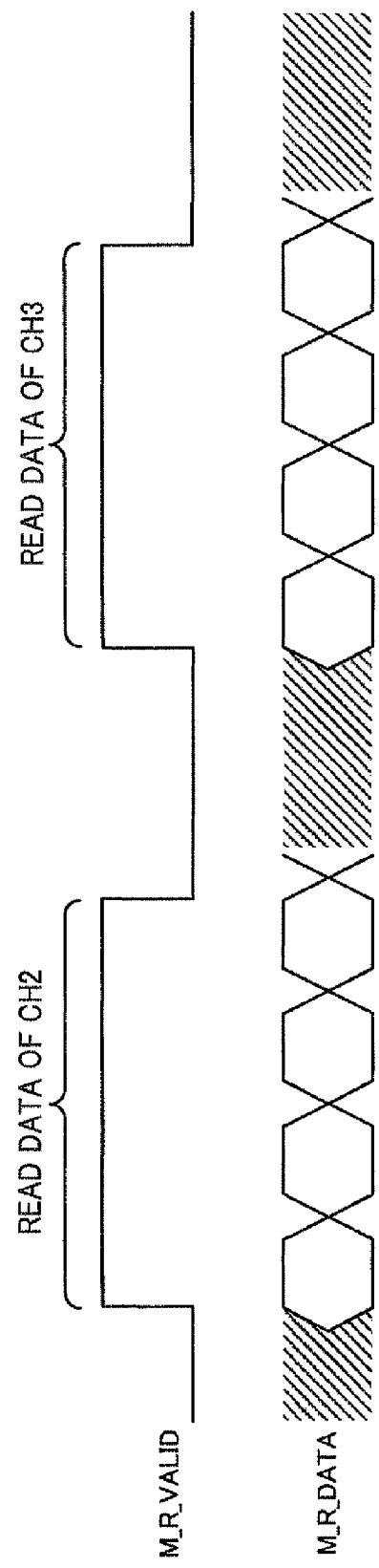
FIG. 7 is an explanatory drawing showing an example of the operation timing of an M_R_VALID signal that is used at the read queue and the queue counter relating to the first exemplary embodiment.

A block diagram showing examples of the schematic structures of the read queue 58 and the queue counter 62 is shown in FIG. 6. FIG. 7 is an explanatory drawing for explaining the operation timing of a data signal M_R_VALID that is used at the read queue 58 and the queue counter 62.

As shown in FIG. 6, the read queue 58 includes an First-In-First-Out (FIFO) type data storage section 59. The number (1 through 5, n) of the channel that is permitted by the arbitration circuit 52 is inputted to the data storage section 59. Further, a write request signal wrreq that expresses a write request and the read signal M_R_VALID that expresses the read request rdreq are inputted to the data storage section 59 (this is not illustrated in FIG. 5). In accordance with these inputted signals, the number of the channel that should currently be read is outputted to the read data selection circuit 60.

The read data selection circuit 60 outputs, to the selected channel and as data signal DATA, the read data that is read-out from the memory 46 on the basis of the number of the channel, that should currently be read that is inputted from the read queue 58, and the signal M_R_VALID that is inputted from the memory controller 48. The M_R_VALID signal is a signal that is outputted from the memory controller 48 and that expresses the effective time period of the read data that is read-out from the memory 46. In the present exemplary embodiment, as shown in FIG. 7, the data from the point in time when the signal switches to high level ("1") until the signal switches to low level ("0") is the read data. FIG. 7 illustrates a case in which the M_R_VALID signal expresses the read data of channel CH2 and the read data of channel CH3.

The queue counter 62 includes an UP/DN (up/down) counter 63. The UP/DN counter 63 counts-down in accordance with the M_R_VALID signal, and counts-up in accordance with the write request signal wrreq, and outputs the count value to the suppressing device 64. Due thereto, when the write request signal wrreq is inputted, the number of the read request signals rdreq, for which reading-out of the read data has not been carried out, is outputted to the suppressing device 64 as a count value.

Figure 8:
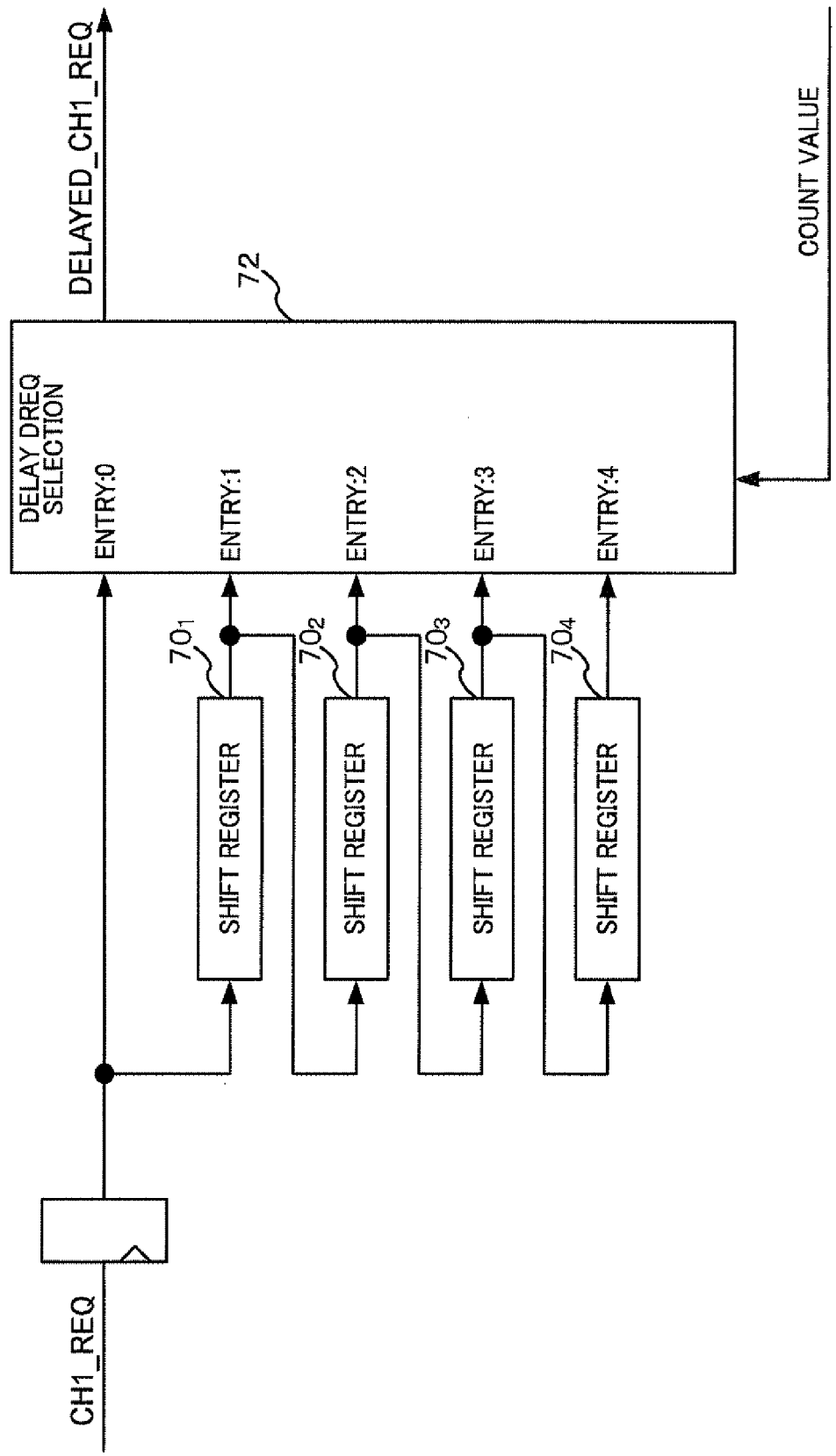
FIG. 8 is a block diagram showing an example of the schematic structure of a suppressing device relating to the first exemplary embodiment.

FIG. 8 is a block diagram of an example of the schematic structure of the suppressing device 64. The suppressing device 64 includes four shift registers (shift registers $70_1$ through $70_4$) and a delay DREQ selection circuit 72. The access request signal CH1_REQ outputted from channel CH1 is inputted to the respective entries of the delay DREQ selection circuit 72 at delayed timings by the shift registers $70_1$ through $70_4$. Concretely, the access request signal CH1_REQ inputted to entry:0 without a delay in timing, and is inputted to entry:1 by shift register $70_1$ with the timing being delayed. Moreover, the access request signal CH1_REQ is inputted to entry:2 by shift register $70_2$ with the timing being delayed, and is inputted to entry:3 by shift register $70_3$ with the timing being delayed, and is inputted to entry:4 by shift register $70_4$ with the timing being delayed.

The delay DREQ selection circuit 72 selects any of the entries in accordance with the count value inputted from the queue counter 62, and outputs the access request signal CH1_REQ, that is inputted to the selected entry, to the arbitration circuit 52 as delay signal DELAYED_CH1_REQ. Due thereto, the access request signal CH1_REQ (the delay signal DELAYED_CH1_REQ) is inputted to the arbitration circuit 52 at a time that is delayed in accordance with the count value. Note that, in the present exemplary embodiment, there are four channels (CH2 through CH5) that output the read request signal rdreq. The timing at which the write request signal wrreq (the access request signal CH1_REQ in the present exemplary embodiment) is inputted to the arbitration circuit 52 is delayed in accordance with a maximum of four of the read request signals rdreq. Therefore, also including the case in which the timing is not delayed, five entries are provided at the delay DREQ selection circuit 72.

First, for comparison with the arbitration device 50 of the present exemplary embodiment, the operation of an arbitration device in a case in which the access request signal CH1_REQ, that is the write request signal wrreq inputted to the arbitration circuit 52, is not suppressed is described. Specifically, the access request signal CH1_REQ is inputted to the arbitration circuit without being delayed in accordance with the count value of the queue counter 62.

Figure 9:
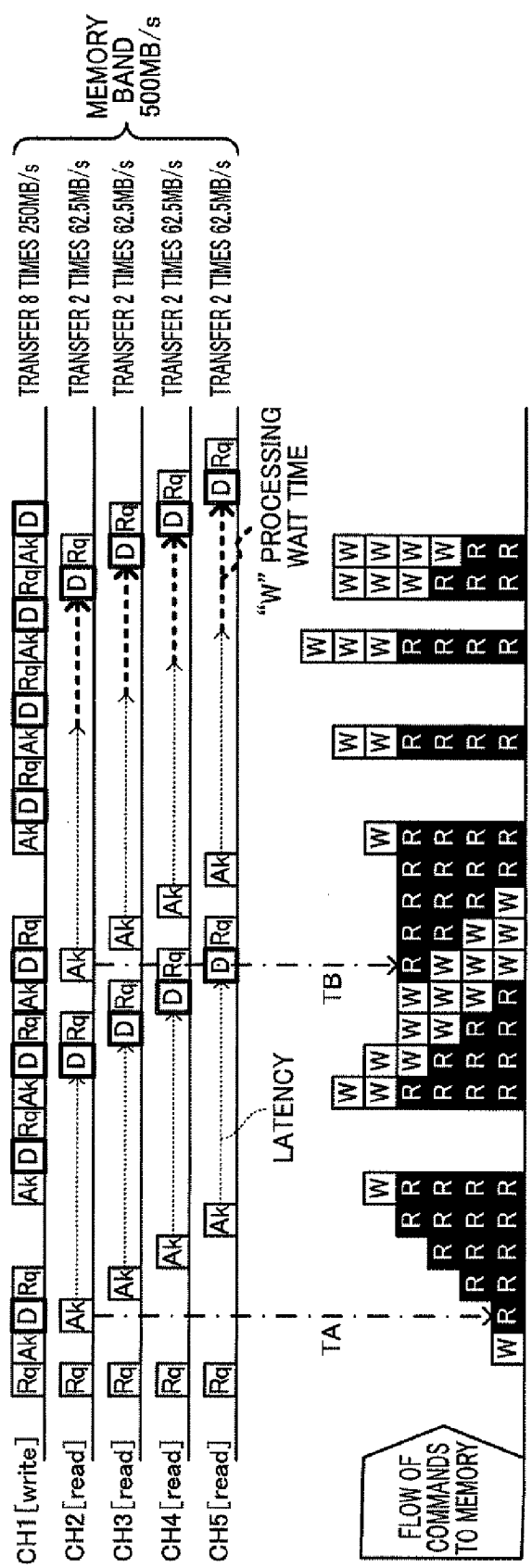
FIG. 9 is an explanatory drawing for explaining an operation example and an example of the states of the bands of a bus when a write request signal is inputted to an arbitration circuit without being suppressed, for comparison with the arbitration device relating to the first exemplary embodiment.

FIG. 9 is an explanatory drawing for explaining an operation example and the states of bands of the bus in a case in which the access request signal CH1_REQ is inputted to the arbitration circuit without being suppressed. In FIG. 9, "Rq" indicates the access request signal REQ, "Ak" indicates the access permission signal ACK, and "D" indicates data transfer (the data signal DATA). The flow of the commands to the memory shows the flow of the command signals COM that are outputted to the memory via the memory controller, and expresses the order of the command signals COM that are awaiting execution, and the lowest level is the command signal COM that is to be executed next. "W" shows that the command signal COM outputted to the memory controller is the write request signal wrreq, and "R" shows that the command signal COM outputted to the memory controller is the read request signal rdreq. In FIG. 9, the reason why the timings of permission signals corresponding to the same page are offset is because permission is granted in order by the round robin arbitration.

Generally, in an SDRAM (including SDR, DDR) that is based on a DRAM, a time period (latency) is required from the time that the read request signal rdreq is outputted to the memory until the time that the read data signal DATA is outputted to the channel that is the read request source.

At channels CH2 through CH5 for the reading operation, the next access request signal REQ is not outputted until the read data is outputted from the memory to the channel that is the request source. Because the latency is long as described above, time is required until the next access request signal REQ is outputted. Therefore, the access request signal CH1_REQ of channel CH1 for the write operation is inputted to the arbitration circuit until the next access request signal REQ outputted, and, in accordance therewith, the access permission signal CH1_ACK is outputted from the arbitration circuit. In the case of FIG. 9 that is illustrated as an example, in the time period shown in FIG. 9, data transfer (refer to "D" in FIG. 9) is carried out eight times at channel CH1, while data transfer is carried out two times each at channels CH2 through CH5. When looking at the band allocation in that time period, channel CH1 is 500×8/(8+2+2+2+2)=250 MB/s, and channels CH2 through CH5 are each 500×2/(8+2+2+2+2)=62.5 MB/s. Generally, the band needed for data read-out for image formation requires greater than or equal to 80 MB/s, and therefore, in the case shown in FIG. 9, the band that is generally required is not ensured.

The read request signal rdreq of channel CH2, for which the access permission signal ACK is outputted at the time shown by TA in FIG. 9, is executed immediately because there is no command signal COM that has been received previously. However, with regard to the read request signal rdreq of channel CH2, for which the access permission signal ACK is outputted at the time shown by TB in FIG. 9, three write request signals wrreq have been received successively previously. Therefore, due to the processing wait for those write request signals wrreq, even more time is required until the data signal DATA is read-out. Also during the processing wait time for these write request signals wrreq, the access request signal CH1_REQ of channel CH1 for the write operation is inputted to the arbitration circuit, and the access permission signal CH1_ACK is outputted. Because this series of flows continues, the standby time until the read request signal rdreq is processed becomes even longer, the time until the data signal DATA is read-out becomes even longer, and the bands of channels CH2 through CH5 become fewer than the above-described value.

Figure 10:
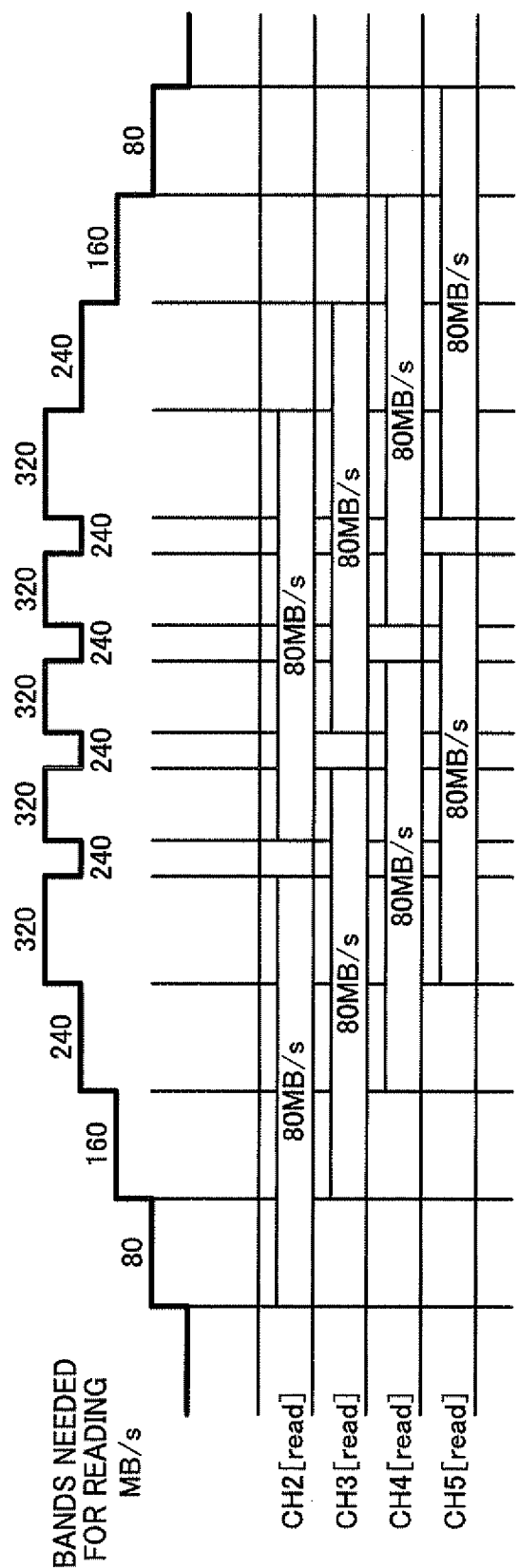
FIG. 10 is an explanatory drawing for explaining an example of changing all bands (the total of the bands that channels CH2 through CH5 use) that are needed for data read-out, in accordance with a tandem gap.
Figure 11:
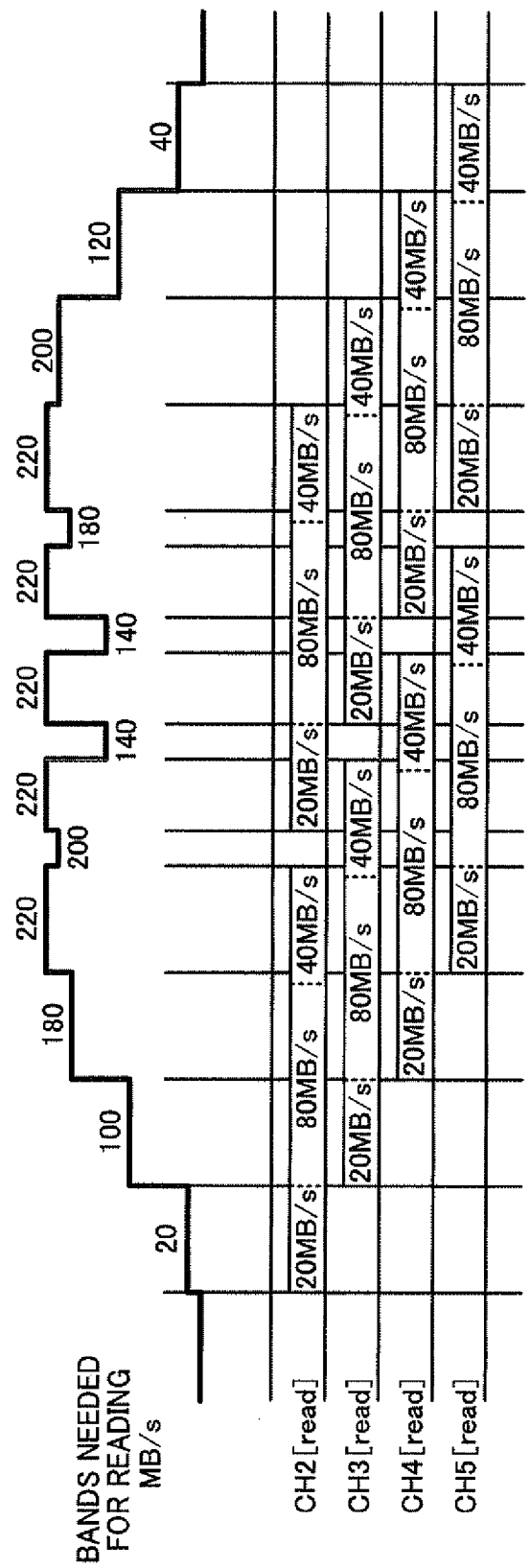
FIG. 11 is an explanatory drawing for explaining an example of changing all bands (the total of the bands that channels CH2 through CH5 use) that are needed for data read-out, in accordance with the compression rate of image data.

All of the bands that are needed for data read-out during printing at the image forming device 12 are not constant values during printing. For example, in the case of a tandem type device such as the image forming device 12 of the present exemplary embodiment, as shown in FIG. 10, all of the bands that are needed for data read-out (the total of the bands that channels CH2 through CH5 use) vary in accordance with the tandem gap. Further, in order to pare down the memory capacity and the like, generally, there are cases in which all of the image data that is stored in the memory 46 from the data transfer device 40, or some of the image data (for example, the upper end and the lower end of the image) is compressed. A case in which some of the image data is compressed is shown in FIG. 11. In such a case, as shown in FIG. 11, all of the bands that are needed for data read-out (the total of the bands that channels CH2 through CH5 use) vary in accordance with the compression rate. In this regard, if, in order to ensure the bands needed for data read-out, the bands are allocated uniformly to the respective channels CH2 through CH5 and the band that channel CH1 uses in data writing is suppressed uniformly by being set to a constant value or the like, a constant transfer performance is allocated to the data writing. Due thereto, there are cases in which the band needed for data writing is not ensured.

Figure 12:
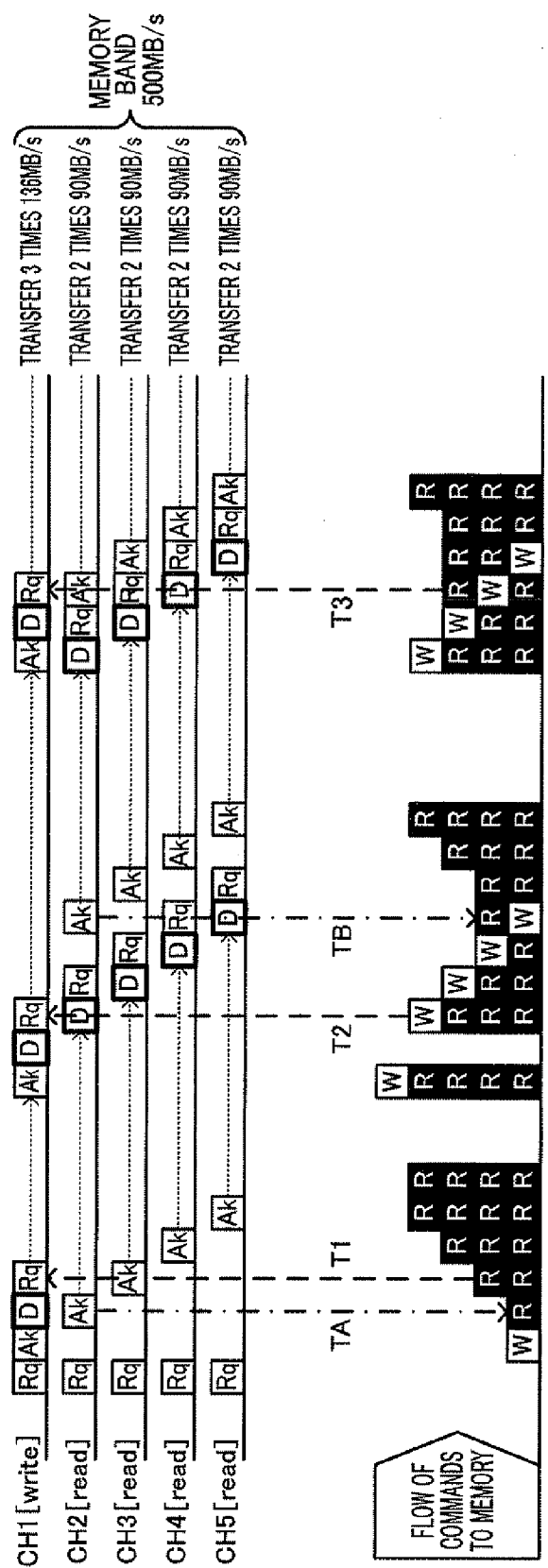
FIG. 12 is an explanatory drawing for explaining an operation example of the arbitration device and an example of the states of the bands of the bus when access request signals REQ are inputted from all image decompressing sections to the arbitration device relating to the first exemplary embodiment.

Operation of the arbitration device 50 of the present exemplary embodiment is described next. FIG. 12 is an explanatory drawing for explaining an operation example and the states of the bands of the bus, when using the most bands of the bus 47 to which the access request signals REQ are inputted from all of the image decompressing sections 42Y through 42K in printing at the image forming device 12. When the access request signal CH1_REQ is outputted from the data transfer device 40 at the time shown by T1 in FIG. 12, two read request signals rdreq have been received previously. Therefore, the count value of the queue counter 62 becomes count value=2, and this count value is inputted to the suppressing device 64, and the time period until the access request signal CH1_REQ is inputted to the arbitration circuit 52 is extended (the timing at which the access request signal CH1_REQ is inputted to the arbitration circuit 52 is delayed). Accordingly, because the time period until the access permission signal CH1_ACK is inputted to the data transfer device 40 is extended, the outputting of a new access request signal CH1_REQ from the data transfer device 40 to the arbitration circuit 52 is suppressed. Further, when the access request signal CH1_REQ is outputted from the data transfer device 40 at the time shown by T2 in FIG. 12, three read request signals rdreq and one write request signal wrreq have been received previously. Therefore, the count value of the queue counter 62 becomes count value=3, and this count value is inputted to the suppressing device 64, and the time period until the access request signal CH1_REQ is inputted to the arbitration circuit 52 is further extended. When the access request signal CH1_REQ is outputted from the data transfer device 40 at the time shown by T3 in FIG. 12, two read request signals rdreq and one write request signal wrreq have been received previously. Therefore, the count value of the queue counter 62 becomes count value=2, and this count value is inputted to the suppressing device 64, and the time period until the access request signal CH1_REQ is inputted to the arbitration circuit 52 is extended. The time period of the extension (delay) is the same as at time T1 at which the count value of the queue counter 62 is the same. Further, because the count value is lower than the count value at time T2, the time period of the extension (delay) becomes shorter than as at time T2.

Because the time period until the access permission signal CH1_ACK is inputted to the data transfer device 40 is extended, the access request signal CH1_REQ is not inputted successively to the arbitration circuit 52. With regard to the read request signals rdreq of channel CH2 for which the access permission signals ACK are outputted at the time shown by TA and the time shown by TB in FIG. 12, no excess write request signal wrreq has been received previously. Therefore, the standby time until the read request signal rdreq of channel CH2 is processed is shorter than in a case in which an excess write request signal wrreq has been received.

During the time period shown in FIG. 12, at channel CH1, data transfer (refer to "D" in FIG. 12) is carried out three times, and, at channels CH2 through CH5, data transfer is carried out two times each. When looking at the band allocation in this time period, channel CH1 is 500×3/(3+2+2+2+2)= 136 MB/s, and channels CH2 through CH5 are each 500×2/ (3+2+2+2+2)=91 MB/s.

Figure 13:
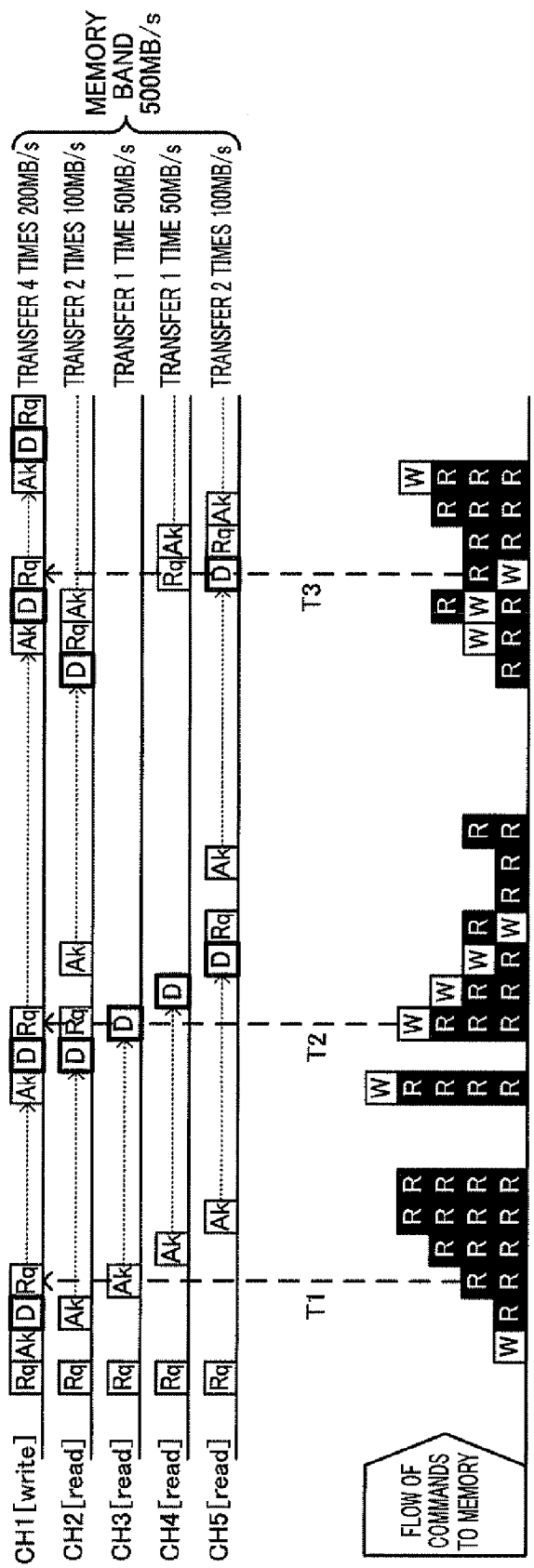
FIG. 13 is an explanatory drawing for explaining an operation example of the arbitration device and an example of the states of the bands of the bus when the access request signals REQ inputted to the arbitration device relating to the first exemplary embodiment change.

FIG. 13 is an explanatory diagram for explaining an operation of the arbitration device and the states of the bands of the bus, in a case in which the bands that are used vary due to changes in the access request signals REQ that are inputted to the arbitration device relating to the present exemplary embodiment during printing at the image forming device 12. FIG. 13 shows operation in a case in which, during printing, the access request signal CH3_REQ is not inputted to the arbitration circuit 52 from channel CH3, and the access request signal CH4_REQ is not inputted to the arbitration circuit 52 from channel CH4. Therefore, there are fewer read request signals rdreq. At the time indicated by T1 in FIG. 13, two read request signals rdreq have been received previously. Therefore, the time period until the access request signal CH1_REQ is inputted from the suppressing device 64 to the arbitration circuit 52 is extended in accordance with the count value=2 of the queue counter 62. At the time indicated by T2 in FIG. 13, three read request signals rdreq and one write request signal wrreq have been received previously. Therefore, the time period until the access request signal CH1_REQ is inputted from the suppressing device 64 to the arbitration circuit 52 is extended in accordance with the count value=3 of the queue counter 62. At the time indicated by T3 in FIG. 13, one read request signal rdreq and one write request signal wrreq have been received previously. Therefore, the time period until the access request signal CH1_REQ is inputted from the suppressing device 64 to the arbitration circuit 52 is extended in accordance with the count value=1 of the queue counter 62. At time T3 shown in FIG. 12, the count value of the queue counter 62 is count value=2, and the count value in the case shown in FIG. 13 is smaller than in this case. Therefore, the time period of the extension (delay) is shorter. Due thereto, the number of write request signals wrreq that is processed is larger.

During the time period shown in FIG. 13, at channel CH1, data transfer (refer to "D" in FIG. 13) is carried out four times, and at channels CH2 and CH5, data transfer is carried out two times each, and at channels CH3 and CH4, data transfer is carried out one time each. When looking at the band allocation in this time period, channel CH1 is 500×4/(4+2+1+1+2)= 200 MB/s, and channels CH2 and CH5 are each 500×2/(4+2+1+1+2)=100 MB/s, and channels CH3 and CH4 are each 500×1/(4+2+1+1+2)=50 MB/s.

As described with reference to FIG. 12 and FIG. 13, in the present exemplary embodiment, the bands needed for writing are ensured in accordance with the bands needed for data reading.

[Second Exemplary Embodiment]

Figure 14:
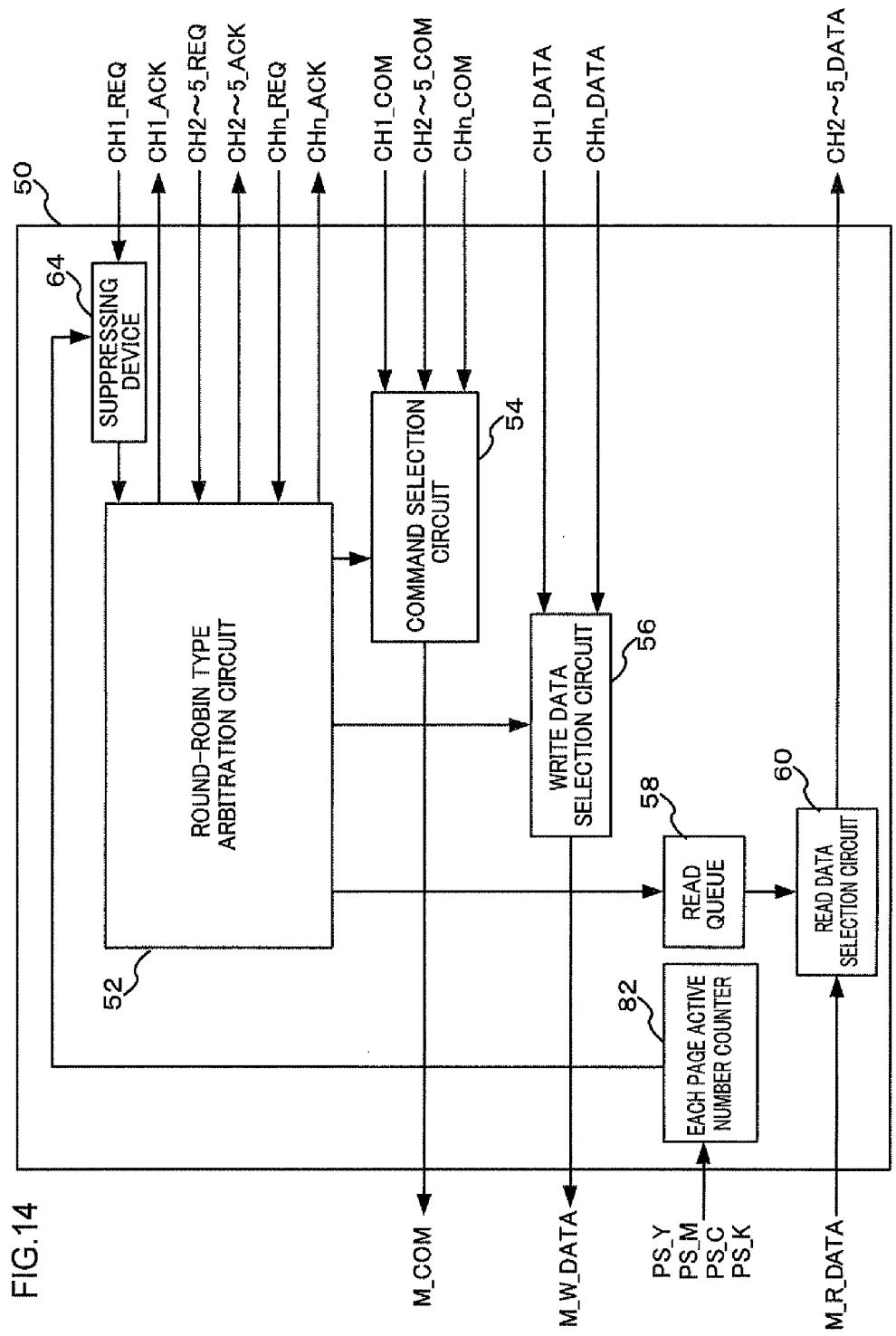
FIG. 14 is a block diagram showing an example of the schematic structure of an arbitration device relating to a second exemplary embodiment.

A block diagram of an example of the schematic structure of an arbitration device relating to a second exemplary embodiment is shown in FIG. 14. An arbitration device 80 of the second exemplary embodiment is a structure that is substantially similar to the first exemplary embodiment, except that an each page active number counter 82 is provided instead of the queue counter 62 provided at the arbitration device 50 of the first exemplary embodiment. Therefore, the same portions are denoted by the same reference numerals, and detailed description thereof is omitted.

Figure 15:
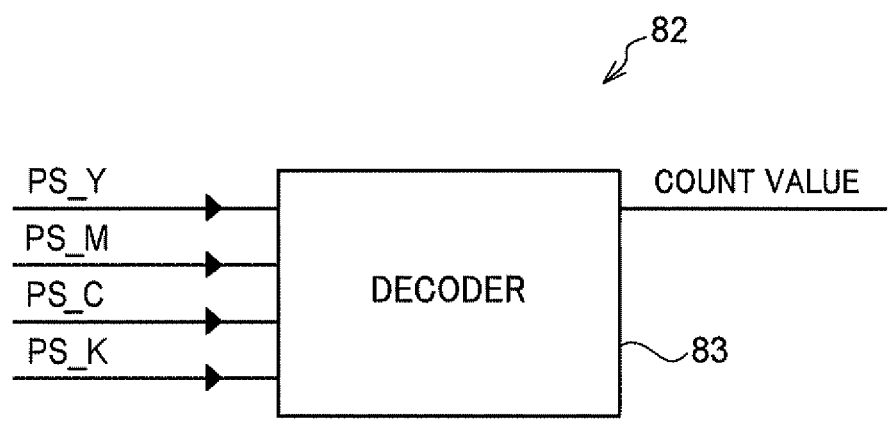
FIG. 15 is a block diagram showing an example of the schematic structure of an each page active number counter relating to the second exemplary embodiment.
Figure 16:
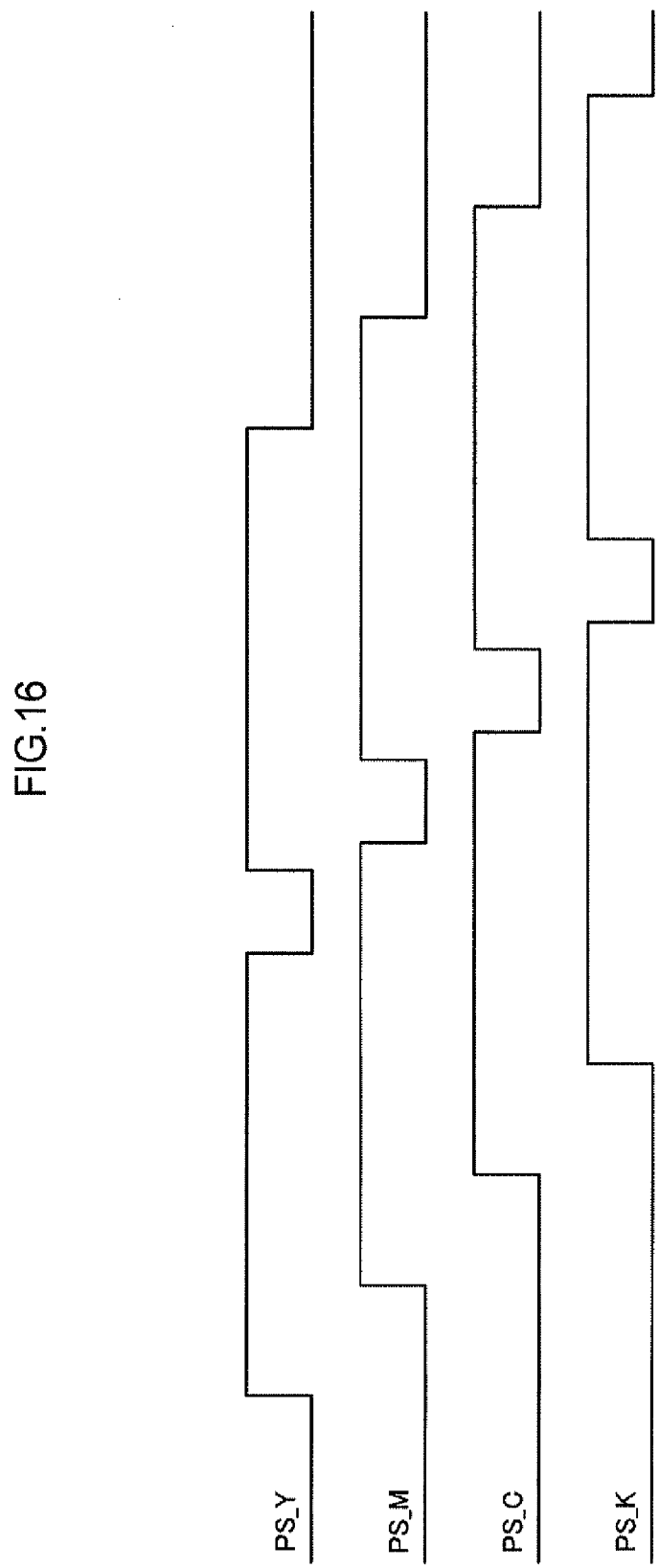
FIG. 16 is an explanatory drawing for explaining examples of page active signals inputted from an image forming device to the each page active number counter relating to the second exemplary embodiment.

A block diagram of an example of the schematic structure of the each page active number counter 82 is shown in FIG. 15. The each page active number counter 82 of the present exemplary embodiment includes a decoder 83. Page active signals PS_Y, PS_M, PS_C, PS_K are inputted from the image forming device 12 to the decoder 83. Examples of the page active signals PS_Y through PS_K are shown in FIG. 16. In an active state, the signal value is "1", and in an inactive state, the signal value is "0". The page active signal expresses whether the image forming device 12 operated (active) or not (inactive) in order to form an image on the same recording medium (the same page), based on image data that was read-out from the memory 46 in accordance with the read request signal rdreq and was outputted to the image forming device 12. More specifically, the page active signal expresses which image of CMYK the image forming device 12 operated in order to form.

An example of a truth value table that is used at the decoder 83 is shown in FIG. 17. In this way, the decoder 83 outputs, to the suppressing device 64 and as the count value, the number of signal values "1" expressing an active state that have been inputted among the four page active signals PS_Y through PS_K.

In the same way as in the first exemplary embodiment, the suppressing device 64 delays, in accordance with the inputted count value, the time at which the write request signal wrreq (the access request signal CH1_REQ in the present exemplary embodiment) is inputted to the arbitration circuit 52.

In this way, in the present exemplary embodiment, the active number of the page active signals PS_Y through PS_K corresponding to the read request signals rdreq is counted at the decoder 83, and the suppressing device 64 delays, in accordance with the count value, the time at which the access request signal CH1_REQ is inputted to the arbitration circuit 52.

As described above, the arbitration device 50 of the first exemplary embodiment is provided with the queue counter 62 and the suppressing device 64. When the write request signal wrreq is inputted, the queue counter 62 counts the number of read request signals rdreq for which reading-out of the read data has not been carried out, and outputs the number to the suppressing device 64 as a count value. In accordance with the inputted count value, the suppressing device 64 suppresses access of channel CH1 by delaying the time at which the access request signal CH1_REQ from channel CH1 is inputted to the arbitration circuit 52.

The arbitration device 80 of the second exemplary embodiment has the each page active number counter 82 and the suppressing device 64. The each page active number counter 82 counts the active number that is the number of times that the image forming device 12 operated in order to form an image on the same page from image data that was read-out from the memory 46 in accordance with the read request signal rdreq and was outputted to the image forming device 12, and the each page active number counter 82 outputs the active number to the suppressing device 64 as the count value. In accordance with the inputted count value, the suppressing device 64 delays the time at which the access request signal CH1_REQ from channel CH1 is inputted to the arbitration circuit 52, thereby suppressing access of channel CH1. In the second exemplary embodiment, the arbitration device 80 is structured by using a more simple circuit than in the first exemplary embodiment.

In this way, the time period until the access request signal CH1_REQ is inputted to the arbitration circuit 52 is adjusted in accordance with the count value. Therefore, the access request signals CH1_REQ are not inputted to the arbitration circuit 52 successively, and the write request signals wrreq are not processed successively. As a result, the processing of the read request signals rdreq is carried out quickly, and the bands of the bus 47 for reading-out image data are ensured. Further, the band of the bus 47 that is needed for writing is ensured in accordance with the bands of the bus 47 needed for image data read-out.

Generally, the band needed for image data read-out is, when the image data is not compressed or the like, 80 MB/s per color. Therefore, regardless of whether or not the 80 MB/s band is entirely used in actuality, for four colors, 80×4=320 MB/s is required. Accordingly, 320 MB/s is similarly required for the band needed for image data writing, and in total, 640 MB/s is needed. However, because the memory band of the bus 47 is 500 MB/s, it is generally the case that compressed image data is used in order for the band to be less than or equal to 500 MB/s. If the image data is compressed by a reversible method in order to maintain the image quality of the image data, the compression rate is low, and therefore, there are cases in which the image data cannot be compressed to less than or equal to 500 MB/s. If the image data is compressed so as to become less than or equal to 500 MB/s, there are cases in which the image quality of the image data is not maintained. However, in the first exemplary embodiment and the second exemplary embodiment, the time period until the access request signal CH1_REQ is inputted to the arbitration circuit 52 is adjusted in accordance with the count value of the queue counter 62 or the each page active number counter 82. Therefore, the bands that are actually used in reading-out of the image data are ensured, and, the remaining bands of the ensured bands are allocated to the writing of image data. As a result, more bands may be allocated to the writing of image data than when 80 MB/s per color is uniformly allocated as described above, and the image quality of the image data can be maintained.

Figure 18:
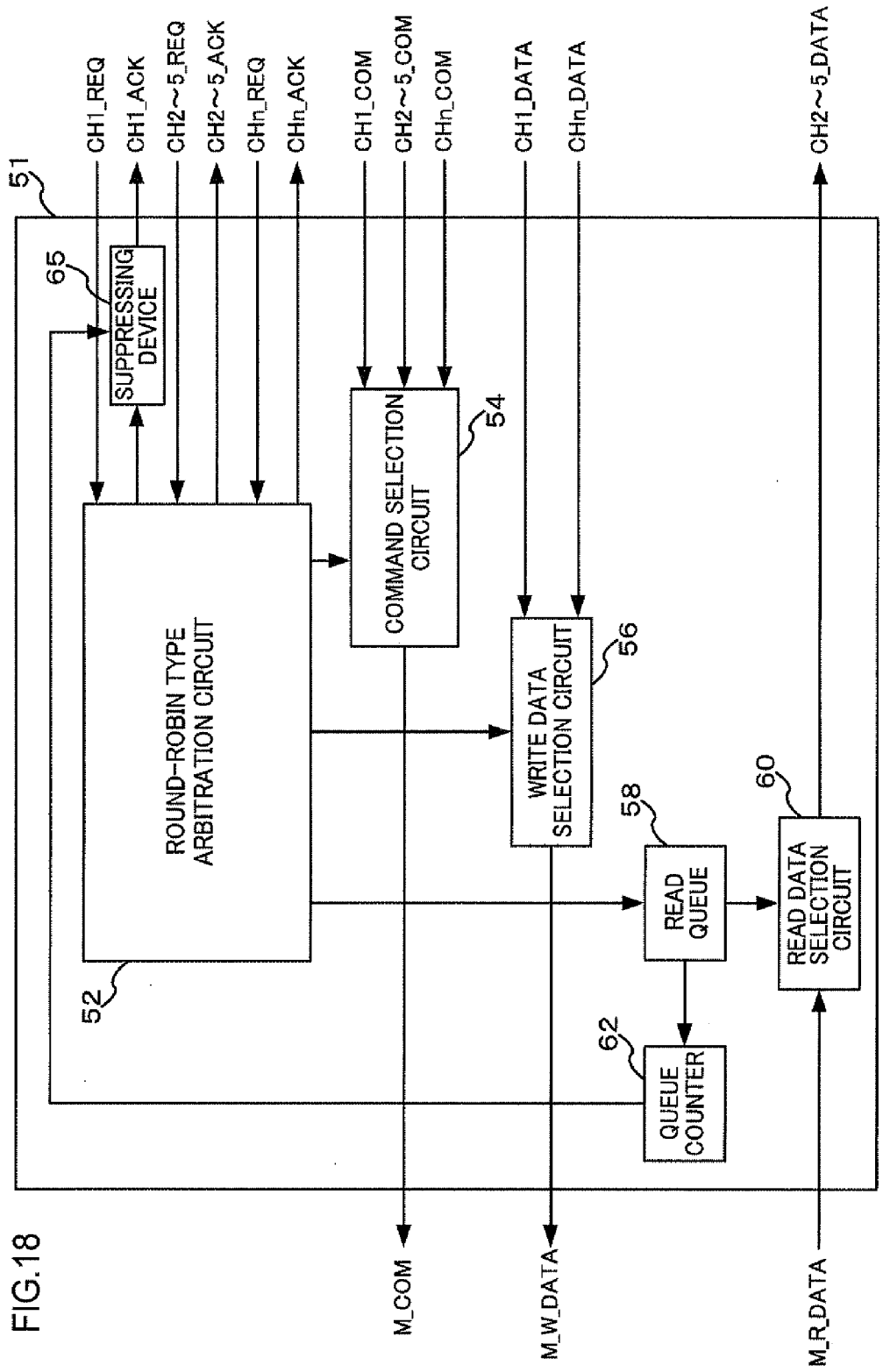
FIG. 18 is a block diagram showing an example of the schematic structure of an arbitration device that extends the time period until an access permission signal CH1_ACK, that is outputted from an arbitration circuit, is inputted to a data transfer device 40.
Figure 19:
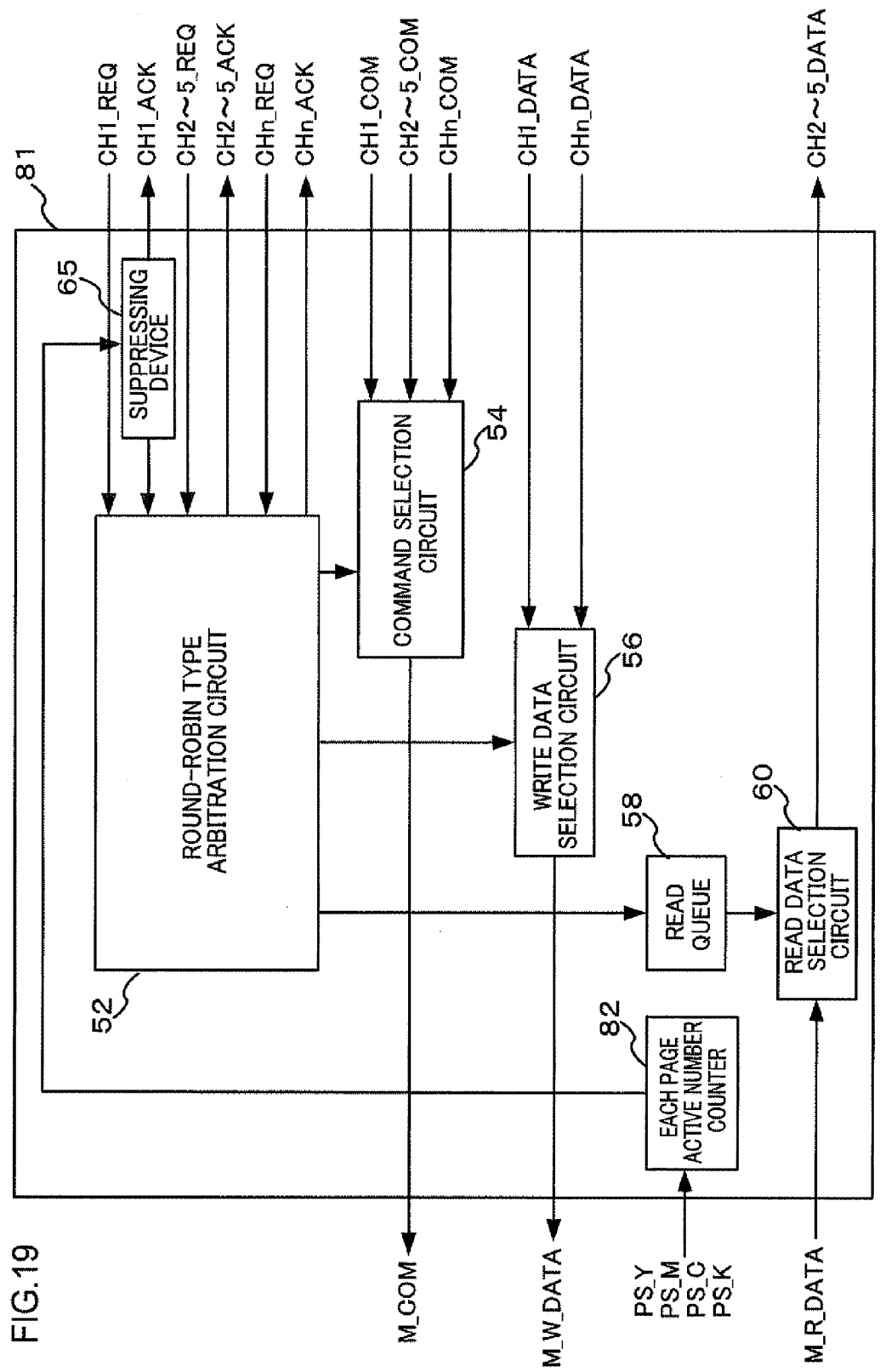
FIG. 19 is a block diagram showing an example of the schematic structure of an arbitration device that extends the time period until the access permission signal CH1_ACK, that is outputted from the arbitration circuit, is inputted to the data transfer device 40.

Note that embodiments are not limited to the first exemplary embodiment and the second exemplary embodiment. In the first exemplary embodiment and the second exemplary embodiment, the suppressing device 64 suppresses access of channel CH1 by delaying the time at which the access request signal CH1_REQ from channel CH1 is inputted to the arbitration circuit 52, in accordance with the inputted count value. However, embodiments are not limited to the same, and may be structured such that access of channel CH1 is suppressed by, in accordance with the inputted count value, extending the time period until the access permission signal CH1_ACK, that is outputted from the arbitration circuit 52, is inputted to the data transfer device 40, such as by a suppressing device 65 of an arbitration device 51 shown in FIG. 18 or the suppressing device 65 of an arbitration device 81 shown in FIG. 19.

The count value that is inputted to the suppressing device 64 is not limited to those of the first exemplary embodiment and the second exemplary embodiment. For example, the queue counter 62 may count the number of times that the read request signal rdreq is received at the read queue 58, and may output the count value to the suppressing device 64. Alternatively, the number of the access request signals CH2_REQ through CH5_REQ outputted from the image decompressing sections 42Y through 42K, or the number of access request signals CH2_REQ through CH5_REQ inputted to the arbitration circuit 52, may be counted.

Although the first and second exemplary embodiments are structured such that I/F board 30 is provided at the DFE 10, embodiments are not limited to the same. The I/F board 30 may be provided at another image processing device, e.g., an image processing device that is provided between the DFE 10 and the image forming device 12, or the like.

Further, although a tandem type printer is employed as the image forming device 12, embodiments are not limited to the same, and the image forming device may be another printer or the like. Note that, because there is a tandem gap as described above, embodiments are highly applicable to a tandem type printer.

Moreover, in the first exemplary embodiment and the second exemplary embodiment, the arbitration device 50 is a device that arbitrates the usage rights of the bus 47 with respect to write requests to store image data in the memory 46 and read requests to read-out image data from the memory 46. However, embodiments are not limited to the same, and the arbitration device may be a device that arbitrates the usage rights of the bus 47 with respect to write requests for storing data other than image data in the memory 46 and read requests for reading-out data other than image data from the memory 46.

What is claimed is:

1. An arbitration device comprising:
    an arbitration section to which write request signals for writing data to a storage using a transfer path, and read request signals for reading-out data from the storage using the transfer path, are inputted from a plurality of request sources, and that arbitrates an order that the inputted write request signals and read request signals use the transfer path, and that, when arbitration is settled, outputs use permission signals to the request sources; and
    a changing section that changes at least one of (a) a time from outputting of the write request signals until inputting of the write request signals to the arbitration section, or (b) a time from outputting of the use permission signals from the arbitration section with respect to the write request signals until inputting of the use permission signals to the request sources.

2. The arbitration device of claim 1 further comprising:
    a counter that counts a number of the read request signals outputted from the request sources, or signals corresponding to the read request signals;
    wherein the changing section extends at least one of the time (a) or (b) in accordance with a count value of the counter.

3. The arbitration device of claim 1, wherein the signals corresponding to the read request signals are the read request signals for which reading-out of data from the storage has not been carried out when the write request signals are outputted from the request sources.

4. The arbitration device of claim 1, wherein the number of the signals corresponding to the read request signals is provided by a signal which indicates a number of read request signals for forming an image on a same recording medium and which is outputted from an image forming device in order to form the image on the recording medium in accordance with data read-out from the storage based on the read request signals outputted from the request sources.

5. An image processing device comprising:
    an image processing section that carries out a predetermined image processing on image data;
    a storage that stores image data that has been subjected to the image processing; and
    the arbitration device of claim 1.

6. An image forming system comprising:
    the image processing device of claim 4; and an image forming section that forms an image on a recording medium on the basis of the image data that has been subjected to the image processing.

7. A method of operating an arbitration device including an arbiter, the method comprising:
    receiving, from a plurality of request sources, write request signals for writing data to a storage by using a transfer path, and read request signals for reading-out data from the storage by using the transfer path;
    changing at least one of (a) a time from outputting of the write request signals until inputting of the write request signals to the arbiter, or (b) a time from outputting of use permission signals from the arbiter with respect to the write request signals until inputting of the use permission signals to the request sources; and
    the arbiter arbitrating an order that the inputted write request signals and read request signals use the transfer path, and, when arbitration is settled, outputting use permission signals to the request sources.

8. The method of claim 7 further comprising:
counting a number of the read request signals received from the request sources, or signals corresponding to the read request signals;
wherein the changing comprises extending at least one of the time (a) or (b) in accordance with a count value of the counting.

* * * * *